(12) United States Patent
Takahashi et al.

(10) Patent No.: US 7,629,393 B2
(45) Date of Patent: Dec. 8, 2009

(54) SOLID POLYMER ELECTROLYTE MEMBRANE AND PROCESS FOR PRODUCING THE SAME, AND FUEL CELL

(75) Inventors: Norifumi Takahashi, Gunma (JP); Toshio Ohba, Gunma (JP); Nobuo Kawada, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 676 days.

(21) Appl. No.: 11/401,249

(22) Filed: Apr. 11, 2006

(65) Prior Publication Data

US 2006/0228609 A1 Oct. 12, 2006

(30) Foreign Application Priority Data

Apr. 12, 2005 (JP) ............ P. 2005-114427

(51) Int. Cl.
*C08J 5/20* (2006.01)
(52) U.S. Cl. ......................... 521/27; 525/276
(58) Field of Classification Search ............ 521/27; 525/276

See application file for complete search history.

(56) References Cited

U.S. PATENT DOCUMENTS

| | | | |
|---|---|---|---|
| 4,396,727 A * | 8/1983 | Ishigaki et al. | 521/27 |
| 4,602,045 A * | 7/1986 | Markus et al. | 521/27 |
| 6,242,123 B1 | 6/2001 | Nezu et al. | |
| 2005/0049320 A1 * | 3/2005 | Yoshida et al. | 521/27 |
| 2006/0105216 A1 * | 5/2006 | Nagai et al. | 429/33 |
| 2006/0134493 A1 * | 6/2006 | Yoshida et al. | 429/33 |

FOREIGN PATENT DOCUMENTS

| | | |
|---|---|---|
| JP | 9-102322 A | 4/1997 |
| JP | 11-111310 A | 4/1999 |
| JP | 11-273696 A | 10/1999 |
| JP | 2001-348439 A | 12/2001 |
| JP | 2002-313364 A | 10/2002 |
| JP | 2003-82129 A | 3/2003 |

* cited by examiner

*Primary Examiner*—Bernard Lipman
(74) *Attorney, Agent, or Firm*—Birch, Stewart, Kolasch & Birch, LLP

(57) ABSTRACT

The present invention relates to a solid polymer electrolyte membrane having both of a higher proton conductivity and a smaller methanol permeability, which can be produced by conducting a graft polymerization of a fluororesin thin membrane irradiated with a radiation with a monofunctional monomer and again irradiating the resulting film with a radiation, followed by conducting a graft polymerization thereof with a polyfunctional monomer; and a high-performance fuel cell comprising the solid polymer electrolyte membrane, a fuel electrode and an air electrode, said solid polymer electrolyte membrane being disposed between the fuel electrode and the air electrode.

5 Claims, No Drawings ium SOLID POLYMER ELECTROLYTE
MEMBRANE AND PROCESS FOR
PRODUCING THE SAME, AND FUEL CELL

FIELD OF THE INVENTION

The present invention relates to a solid polymer electrolyte membrane and a process for producing the same, and a fuel cell.

BACKGROUND OF THE INVENTION

Since a fuel cell using a solid polymer electrolyte membrane exhibits a low working temperature of 100° C. or lower and a high energy density, it is expected to put it into practical use in power sources for electric vehicles, simplified auxiliary power sources for electric/electronic devices, domestic fixed power sources, and the like. In the field of solid polymer electrolyte membrane-type fuel cell, there are included important elemental technologies on a solid polymer electrolyte membrane, a platinum-based catalyst, a gas-diffusion electrode, a conjugate of the solid polymer electrolyte membrane with the gas diffusion electrode, and the like. Among these, it is one of the most important technologies to develop a solid polymer electrolyte membrane having good properties as a fuel cell.

In the solid polymer electrolyte membrane-type fuel cell, a gas diffusion electrode is combined with both sides of a solid polymer electrolyte membrane and the solid polymer electrolyte membrane and the gas diffusion electrode substantially form an integral structure. Therefore, the solid polymer electrolyte membrane acts as an electrolyte for conducting protons and also plays a role as a diaphragm for preventing direct mixing of hydrogen or methanol as a fuel with an oxidizing agent even under elevated pressure. As such a solid polymer electrolyte membrane, it is required to have a large migration rate of protons and a high ion-exchange capacity and to have a constant and high water retentivity for maintaining a low electrical resistance, as an electrolyte. On the other hand, in view of the role as a diaphragm, it is also required to have a large mechanical strength, an excellent dimensional stability, an excellent chemical stability against a long-term use, no excessive permeability to hydrogen gas or methanol as a fuel and oxygen gas as an oxidizing agent, and the like.

In an early solid polymer electrolyte membrane-type fuel cell, an ion-exchange membrane of a hydrocarbon resin produced by copolymerization of styrene with divinylbenzene was used as an electrolyte membrane. However, this type of electrolyte membrane is low in durability and hence poor in practicality. Thereafter, a fluororesin-based perfluorosulfonic acid membrane "Nafion (registered trademark of Du Pont)" developed by Du Pont has been commonly used.

Conventional fluororesin-based electrolyte membranes such as "Nafion" are excellent in chemical durability and stability. However, in the case that they are employed in a direct methanol fuel cell (DMFC) where methanol is used as a fuel, they have a problem of occurrence of a crossover phenomenon that methanol passes through the electrolyte membranes, resulting in a decreased output.

Furthermore, since the fluororesin-based electrolyte membranes are produced with starting from monomer synthesis, there is a problem that production thereof requires many steps and a high cost, which is a large obstacle for their practical use.

Therefore, it has been attempted to develop a low cost electrolyte membrane which may be substituted for the above "Nafion" or the like, and there have been proposed processes for producing solid polymer electrolyte membranes by introducing a sulfonic acid group into fluororesin-based membranes (e.g., see, Patent Documents 1 to 3).

Patent Document 1: JP-A-2001-348439
Patent Document 2: JP-A-2002-313364
Patent Document 3: JP-A-2003-82129

SUMMARY OF THE INVENTION

A styrene/divinylbenzene co-graft membrane, obtainable by co-graft polymerization of a fluororesin irradiated with a radiation through simultaneous charging of two or more raw materials for grafting such as styrene and divinylbenzene, has proton conductivity equal to or higher than that of "Nafion", and also methanol permeability thereof can be reduced to a degree equal to or lower than that of "Nafion". However, further decrease of the methanol permeability requires increase in the amount of divinylbenzene as a crosslinking agent, which may, on the other hand, remarkably lower the proton conductivity.

As mentioned above, further improvement of the proton conductivity and further decrease in the methanol permeability are highly desired, but the situation is that it is difficult to satisfy both of them simultaneously. Accordingly, an object of the invention is to provide a solid polymer electrolyte membrane having both of a higher proton conductivity and a smaller methanol permeability, and a further object thereof is to provide a high-performance fuel cell.

As a result of extensive studies for achieving the above objects, the present inventors have found that a solid polymer electrolyte membrane having both of a high proton conductivity and a small methanol permeability can be produced by conducting a graft polymerization of a fluororesin thin membrane irradiated with a radiation with a monofunctional monomer and again irradiating the resulting film with a radiation, followed by conducting a graft polymerization thereof with a polyfunctional monomer. Thus, they have accomplished the present invention.

Namely, the present invention relates to a solid polymer electrolyte membrane and a process for producing the same, and a fuel cell shown below.

(1) A process for producing a solid polymer electrolyte membrane, which comprises:
   irradiating a membrane comprising a fluororesin with a radiation,
   conducting a subsequent first graft polymerization of the membrane with a monofunctional monomer,
   irradiating the membrane subjected to the first graft polymerization with a radiation,
   conducting a subsequent second graft polymerization of the membrane with a polyfunctional monomer, and
   introducing a sulfonic acid group into the membrane subjected to the second graft polymerization.

(2) The process according to (1) above, wherein the fluororesin is at least one selected from polytetrafluoroethylene, tetrafluoroethylene-perfluoroalkyl vinyl ether-based copolymer, tetrafluoroethylene-hexafluoropropylene-based copolymer, and ethylene-tetrafluoroethylene copolymer.

(3) The process according to (1) above, wherein the monofunctional monomer is at least one selected from styrene, p-fluorostyrene, α-methylstyrene, and trifluorostyrene.

(4) The process according to (1) above, wherein the polyfunctional monomer is at least one of divinylbenzene and trialyl cyanurate.

(5) The process according to (1) above, wherein the radiation is an electron beam.

(6) A solid polymer electrolyte membrane, which is obtainable by the process according to (1) above.

(7) A fuel cell comprising the solid polymer electrolyte membrane according to (6) above, a fuel electrode and an air electrode, said solid polymer electrolyte membrane being disposed between the fuel electrode and the air electrode.

(8) The fuel cell according to (7) above, which is a direct methanol fuel cell.

Since the solid polymer electrolyte membrane produced according to the invention exhibits a high ionic conductivity and a small methanol permeability, the membrane is suitable as an electrolyte membrane for fuel cells, particularly an electrolyte membrane for direct methanol fuel cells, and a high performance can be realized.

DETAILED DESCRIPTION OF THE INVENTION

The followings will describe the present invention in detail.

The solid polymer electrolyte membrane of the invention uses a thin membrane (film or sheet) comprising a fluororesin as a starting material. The thickness of the membrane may be the same as that of a common solid polymer electrolyte membrane and is preferably from 10 μm to 200 μm, more preferably from 20 μm to 100 μm. When the thickness is less than 10 μm, the membrane is easy to be broken and hence the case is not preferable. When the thickness exceeds 200 μm, the electrical resistance increases and hence the case is not preferable. Although the methods for processing a fluororesin into a thin membrane are not particularly limited, extrusion molding, casting method, cutting method and the like may be mentioned, and extrusion molding is simple and convenient.

Moreover, the kind of the fluororesin is also not particularly limited but preferred are polytetrafluoroethylene, tetrafluoroethylene-perfluoroalkyl vinyl ether-based copolymer, tetrafluoroethylene -hexafluoropropylene-based copolymer, and ethylene -tetrafluoroethylene copolymer, since they have excellent physical properties as a membrane and are suitable for a radiation graft polymerization process. Among these, ethylene-tetrafluoroethylene copolymer is particularly preferable. Further, these resins may be used singly or arbitrarily in combination.

The above fluororesin thin membrane is first irradiated with a radiation at room temperature in an atmosphere of an inert gas such as $N_2$, He, or Ar. The radiation is preferably an electron beam, γ-ray, or X-ray and most preferably an electron beam. The irradiation dose depends on the kind of the radiation and further the kind and thickness of the fluororesin thin membrane, but is preferably from 1 to 200 kGy, more preferably from 1 to 100 kGy in the case of irradiating the above fluororesin thin membrane with an electron beam.

Subsequently, the above radiation-irradiated fluororesin thin membrane is grafted with a monofunctional monomer (first graft polymerization step). The monofunctional monomer is preferably a monomer having one ethylenically unsaturated group in a molecule such as a styrene-based monomer, and specifically, styrene, p -fluorostyrene, α-methylstyrene, or trifluorostyrene can be used singly or arbitrarily in combination. Among these, styrene and p-fluorostyrene are particularly preferable. Although the method for conducting first graft polymerization is not particularly limited, it may be conducted, for example, by a method in which the radiation-irradiated fluororesin thin membrane is immersed in a solution containing the monofunctional monomer and subsequently heated at 50 to 60° C. for 10 to 20 hours under a nitrogen atmosphere. Moreover, the graft ratio through the first graft polymerization step is preferably from 1 to 100%, more preferably 10 to 60%, and still more preferably 20 to 50%. In this regard, the graft ratio through the first graft polymerization step is determined according to the following formula.

Graft ratio through the first graft polymerization step={(Film weight after grafting with monofunctional monomer−Film weight before grafting)/Film weight before grafting}×100(%)

The fluororesin thin membrane grafted with the monofunctional monomer is preferably washed with toluene, acetone, or the like and subsequently dried under vacuum in order to remove decomposed matter and unreacted matter on the surface.

Then, the above fluororesin thin membrane grafted with the monofunctional monomer is again irradiated with a radiation at room temperature in an atmosphere of an inert gas such as $N_2$, He, or Ar. The radiation is preferably an electron beam, γ-ray, or X-ray and most preferably an electron beam. The irradiation dose depends on the kind of the radiation and further the kind and thickness of the fluororesin thin membrane, but is preferably from 1 to 200 kGy, more preferably from 1 to 100 kGy in the case of irradiating the above styrene-grafted fluororesin thin membrane with an electron beam.

Further, the above fluororesin thin membrane grafted with the monofunctional monomer and again irradiated with a radiation is grafted with a polyfunctional monomer (second graft polymerization step). The polyfunctional monomer is preferably a monomer having two or more ethylenically unsaturated groups in a molecule such as divinylbenzene or triallyl cyanurate, which can be used singly or arbitrarily in combination. In this regard, divinylbenzene is particularly preferable. Although the method for conducting second graft polymerization is not particularly limited, it may be conducted, for example, by a method in which the fluororesin thin membrane grafted with the monofunctional monomer and again irradiated with a radiation is immersed in a solution containing the polyfunctional monomer and subsequently heated at 50 to 60° C. for 5 to 10 hours under a nitrogen atmosphere. Moreover, the graft ratio through the second graft polymerization step is preferably from 1 to 50%, more preferably 1 to 30%, and still more preferably 5 to 20%. In this regard, the graft ratio through the second graft polymerization step is determined according to the following formula.

Graft ratio through the second graft polymerization step={(Film weight after grafting with polyfunctional monomer−Film weight after grafting with monofunctional monomer)/Film weight before grafting}×100(%)

The fluororesin thin membrane grafted with the polyfunctional monomer is preferably washed with toluene, acetone, or the like and subsequently dried under vacuum in order to remove decomposed matter and unreacted matter on the surface.

By the above two-step radiation graft polymerization, part of the fluororesin thin membrane is grafted with the monofunctional monomer and another part of remaining one is grafted with the polyfunctional monomer. In this regard, since the first graft polymerization and the second graft polymerization of the present invention are conducted for a long time, not only the surface but also the inside of the fluororesin thin membrane are grafted with the monofunctional monomer and the polyfunctional monomer.

Then, a sulfonic acid group is introduced into the above fluororesin thin membrane grafted with the monofunctional monomer and the polyfunctional monomer to obtain the solid polymer electrolyte membrane of the present invention. The sulfonic acid group is introduced into the aromatic rings of the monofunctional monomer and the polyfunctional monomer as a substituent. In this regard, a method for introducing the sulfonic acid group may be the conventional methods, and may be carried out by bring the thin film being into contact with chlorosulfonic acid or fluorosulfonic acid. Although it is not particularly limited, for example, it can be carried out by soaking the thin film into a solution containing chlorosulfonic acid, followed by heating the same; or by soaking the thin film into concentrated sulfuric acid or fuming sulfuric acid.

It is considered that the solid polymer electrolyte membrane of the present invention exhibits a high ionic conductivity, since flexibility of the sulfonic group in the side chain is maintained owing to the two-step radiation grafting and the membrane has a low methanol permeability owing to a high crosslinking density. Accordingly, the solid polymer electrolyte membrane of the present invention is particularly suitable as an electrolyte membrane for direct methanol fuel cells.

The present invention also relates to a fuel cell wherein the above solid polymer electrolyte membrane is disposed between a fuel electrode and an air electrode. In the present invention, although the constitution and the structure of the fuel cell except the solid polymer electrolyte membrane is not particularly-limited, the constitution is preferably a direct methanol fuel cell using methanol as a fuel since the solid polymer electrolyte membrane exhibits a low methanol permeability.

EXAMPLES

The following will describe the present invention with reference to Example and Comparative Examples, but the present invention is by no means limited thereto.

Example 1

After a film comprising an ethylene-tetrafluoroethylene copolymer (manufactured by Norton) having a thickness of 25 μm was irradiated with an electron beam at 3 kGy at room temperature in nitrogen atmosphere, the film was immersed in a separable flask to which 40 parts by weight of styrene, 40 parts by weight of toluene, and 0.01 part by weight of azobisisobutyronitrile had been charged and heated at 60° C. for 16 hours under a nitrogen atmosphere to obtain a styrene graft-polymerization membrane having a styrene graft ratio of 33%. In this regard, the styrene graft ratio was determined according to the following formula.

Styrene graft ratio={(Film weight after styrene grafting−Film weight before grafting)/Film weight before grafting}×100(%)

In this regard, the film weight after styrene grafting was a weight of the film obtained by washing the film after styrene grafting with toluene once and with acetone three times and drying it at 60° C. for 2 hours under vacuum.

Subsequently, after the styrene-grafted film was irradiated with an electron beam at 30 kGy at room temperature in nitrogen atmosphere, the film was immersed in a separable flask to which 40 parts by weight of divinylbenzene, 40 parts by weight of toluene, and 0.01 part by weight of azobisisobutyronitrile had been charged and heated at 60° C. for 5 hours under a nitrogen atmosphere to obtain a styrene/divinylbenzene graft-polymerization membrane having a divinylbenzene graft ratio of 11%. In this regard, the divinylbenzene graft ratio was determined according to the following formula.

Divinylbenzene graft ratio={(Film weight after divinylbenzene grafting−Film weight after styrene grafting)/Film weight before grafting}×100(%)

In this regard, the film weight after divinylbenzene grafting was a weight of the film obtained by washing the film after divinylbenzene grafting with toluene once and with acetone three times and drying it at 60° C. for 2 hours under vacuum.

Then, the above styrene/divinylbenzene graft polymerization membrane was immersed in a mixed solution of 30% by weight of chlorosulfonic acid and 70% by weight of 1,2-dichloroethane, heated at 50° C. for 2 hours, and then immersed in a 1N potassium hydroxide aqueous solution at 90° C. for 1 hour to effect hydrolysis. Subsequently, the film was immersed in a 2N hydrochloric acid at 90° C. for 1 hour and washed with pure water three times to obtain a solid polymer electrolyte membrane having a sulfonic acid group.

The resulting solid polymer electrolyte membrane had a surface ionic conductivity after 1 hour of immersion in pure water of 0.1 S/cm and a methanol permeability at 10 M of 0.4 kg/m²·h.

Comparative Example 1

After a film comprising an ethylene-tetrafluoroethylene copolymer (manufactured by Norton) having a thickness of 25 μm was irradiated with electron beam at 3 kGy at room temperature in nitrogen atmosphere, the film was immersed in a separable flask to which 40 parts by weight of styrene, 2 parts by weight of divinylbenzene, 40 parts by weight of toluene, and 0.01 part by weight of azobisisobutyronitrile had been charged and heated at 60° C. for 16 hours under a nitrogen atmosphere to obtain a styrene/divinylbenzene co-graft polymerization membrane having a styrene/divinylbenzene graft ratio of 32%. In this regard, the styrene/divinylbenzene graft ratio was determined according to the following formula.

Styrene/divinylbenzene graft ratio={(Film weight after styrene/divinylbenzene grafting−Film weight before grafting)/Film weight before grafting}×100(%)

Then, the above styrene/divinylbenzene co-graft polymerization membrane was immersed in a mixed solution of 30% by weight of chlorosulfonic acid and 70% by weight of 1,2-dichloroethane, heated at 50° C. for 2 hours, and then immersed in a 1N potassium hydroxide aqueous solution at 90° C. for 1 hour to effect hydrolysis. Subsequently, the film was immersed in a 2N hydrochloric acid at 90° C. for 1 hour and washed with pure water three times to obtain a solid polymer electrolyte membrane having a sulfonic acid group.

The resulting solid polymer electrolyte membrane had a surface ionic conductivity after 1 hour of immersion in pure water of 0.08 S/cm and a methanol permeability at 10 M of 0.8 kg/m²·h.

Comparative Example 2

After a film composed of an ethylene-tetrafluoroethylene copolymer (manufactured by Norton) having a thickness of 25 μm was irradiated with electron beam at 20 kGy at room temperature in nitrogen atmosphere, the film was immersed in a separable flask to which 40 parts by weight of styrene, 10 parts by weight of divinylbenzene, 40 parts by weight of toluene, and 0.01 part by weight of azobisisobutyronitrile had been charged and heated at 60° C. for 16 hours under a nitrogen atmosphere to obtain a styrene/divinylbenzene co-graft polymerization membrane having a styrene/divinylbenzene graft ratio of 38%. In this regard, the styrene/divinylbenzene graft ratio was determined in the same manner as in Comparative Example 1.

Then, the above styrene/divinylbenzene co-graft polymerization membrane was immersed in a mixed solution of 30% by weight of chlorosulfonic acid and 70% by weight of 1,2-dichloroethane, heated at 50° C. for 2 hours, and then immersed in a 1N potassium hydroxide aqueous solution at 90° C. for 1 hour to effect hydrolysis. Subsequently, the film was immersed in a 2N hydrochloric acid at 90° C. for 1 hour and washed with pure water three times to obtain a solid polymer electrolyte membrane having a sulfonic acid group.

The resulting solid polymer electrolyte membrane had a surface ionic conductivity after 1 hour of immersion in pure water of 0.03 S/cm and a methanol permeability at 10 M of 0.6 kg/m$^2$·h.

From the above Example and Comparative Examples, it was confirmed that the solid polymer electrolyte membrane subjected to two-step radiation graft polymerization according to the present invention has a high ionic conductivity and a low methanol permeability.

While the present invention has been described in detail and with reference to specific embodiments thereof, it will be apparent to one skilled in the art that various changes and modifications can be made therein without departing from the scope thereof.

This application is based on Japanese patent application No. 2005-114427 filed Apr. 12, 2005, the entire contents thereof being hereby incorporated by reference.

What is claimed is:

1. A process for producing a solid polymer electrolyte membrane, which comprises:
    irradiating a membrane comprising a fluororesin with a radiation,
    conducting a subsequent first graft polymerization of the membrane with a monofunctional monomer,
    irradiating the membrane subjected to the first graft polymerization with a radiation,
    conducting a subsequent second graft polymerization of the membrane with a polyfunctional monomer, and
    introducing a sulfonic acid group into the membrane subjected to the second graft polymerization.

2. The process according to claim 1, wherein the fluororesin is at least one selected from polytetrafluoroethylene, tetrafluoroethylene-perfluoroalkyl vinyl ether-based copolymer, tetrafluoroethylene-hexafluoropropylene-based copolymer, and ethylene-tetrafluoroethylene copolymer.

3. The process according to claim 1, wherein the monofunctional monomer is at least one selected from styrene, p-fluorostyrene, α-methylstyrene, and trifluorostyrene.

4. The process according to claim 1, wherein the polyfunctional monomer is at least one of divinylbenzene and triallyl cyanurate.

5. The process according to claim 1, wherein the radiation is an electron beam.

* * * * *